J. A. FERGUSON.
MOLD FOR TILES.
APPLICATION FILED APR. 2, 1918.
1,272,647.
Patented July 16, 1918.
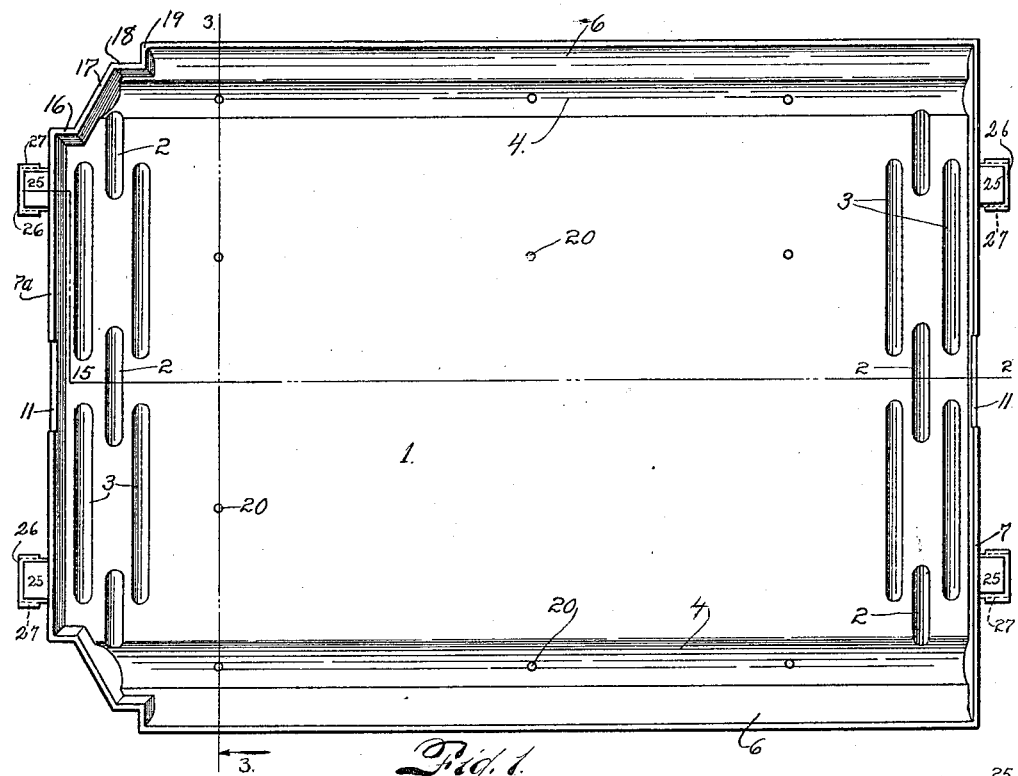
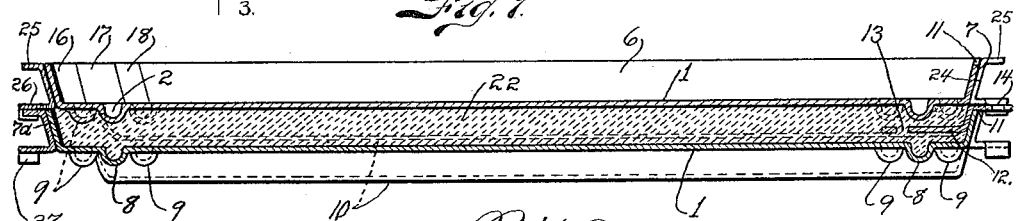
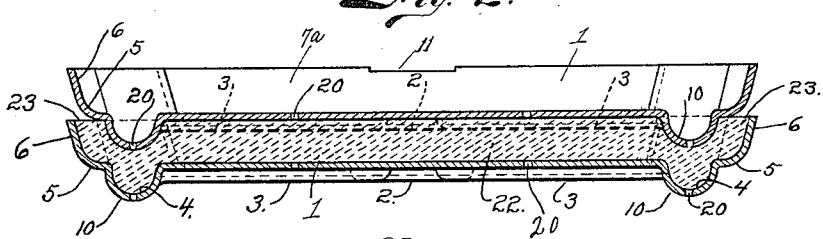
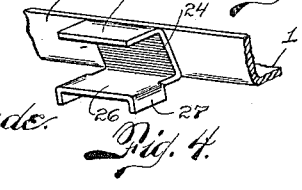
Inventor
John A. Ferguson.
Witness
John B. Wade.
by Wilkinson & Ginsta
his Attorneys

UNITED STATES PATENT OFFICE.

JOHN A. FERGUSON, OF DENVER, COLORADO.

MOLD FOR TILES.

1,272,647.　　　　Specification of Letters Patent.　　Patented July 16, 1918.

Application filed April 2, 1918.　Serial No. 226,186.

*To all whom it may concern:*

Be it known that I, JOHN A. FERGUSON, a citizen of the United States, residing at the city and county of Denver and State of Colorado, have invented certain new and useful Improvements in Molds for Tiles; and I do hereby declare the following to be a full, clear, and exact description of the invention, such as will enable others skilled in the art to which it appertains to make and use the same.

This invention relates to improvements in molds for tiles, and especially for tiles manufactured from any suitably prepared substance, such as a cement mixture or other plastic material.

While the invention is primarily designed for molding "roofing" tiles, I do not limit myself to that specific use, as obviously the improved type of mold elements, and their arrangement to function in a novel manner, may be employed in the manufacture of tiles generally, wherein it is desired that one tile is to be laid in overlapped and inter-engaged association with another in tiling a surface, whether as a roofing or otherwise.

As stated in my prior Patent #1,244,484 of October 30, 1917, such quaky mixtures having a tendency to settle when in that soft state, by molding each tile, with its top facing downwardly, in a suitable shallow settling mold pan, the heavier particles in part become more evenly distributed toward the bottom of the mold pan, resulting in a smooth finished top surface for the tile, in the nature of a thoroughly indurated facing when the plastic substance is fully set, obviously reinforcing the whole body structure thereof.

With this general aim in view, therefore, of preserving the superior quality of such tiles as to uniform coherence and finished facing, I mold a number of the tiles, in the manner and for the purposes set forth, at substantially one operation, by the employment of settling mold pans, of a particular structure and of uniform dimensions, functioning in stacked relation to cause the exterior bottom of a superposed mold pan to form the interlocking grooves in the bottom face of the tile being molded in the pan below, while the interior bottom face of the latter pan forms corresponding or complementary locking beads on the top face of the tile being molded therein.

However, I do not make any distinctive claims to these features herein, as they are not now broadly new, and the primary object of the present invention is to produce tiles of specially formed design, and more particularly, by combining certain novel details of construction in association with the older features and functioning of the mold pans, to compensate for any surplus material in the filled pans by providing for its proper exudation when a pan is superposed thereover, with the pattern beads of its exterior bottom face sunk into the soft or quaky substance in the pan below, thus insuring the uniform thickness of the tiles.

With these prefacing remarks, reference will now be had to the accompanying drawings, in a more detailed description of the present improvements, in which drawings like reference characters designate the same parts in the several views thereof, of which—

Figure 1, is a top plan view looking down into the interior of one of the settling mold pans;

Fig. 2, is a vertical sectional view through a pair of said mold pans, in their plurally stacked relation, the section being indicated longitudinally along the plane of the line 2—2 of Fig. 1, and the lower pan only being filled with the plastic substance for better illustrative purposes;

Fig. 3, is an analogously stacked vertical sectional view, taken transversely along the plane of the line 3—3 of Fig. 1; and Fig. 4, is a detail perspective view of an improved end supporting, guiding and centering member.

1 designates the closed bottom of a shallow settling mold pan, the interior surface of which, at its ends, is suitably depressed to form the staggered series of short and longer transverse pattern grooves 2 and 3, and similarly along the sides of the bottom of the pan are formed longitudinal depressions providing for the elongated side pattern grooves 4, of substantially greater depth than the staggered transverse pattern grooves, the outer wall faces of which longitudinal pattern grooves, it will be especially noted, curve outwardly and upwardly from positions in line with the bottom 1 of the pan, as indicated at 5, and from thence extend upwardly in offset divergent planes, providing the flaring side walls 6 of the pan proper.

The end walls 7—7ᵃ of the pan also flare upwardly at a slight inclination analogously to the portions 6 of the side walls, but they do not have the lower bulged or offsetting curved portions 5, which latter permit of certain important functionings of the pan molds when assembled in stacked relation, in addition to their molding features, as hereinafter more fully appearing.

In consequence of the depressions 2, 3 and 4, it will be obvious that congruent transverse and longitudinal pattern beads 8, 9 and 10, respectively, will be likewise formed on the exterior face of the bottom 1, and the pattern grooves 4 and 10 extend from one end wall of the pan to the other end wall thereof.

One or both top faces of the end walls may be cut away slightly to provide the shallow recesses 11 adapted to receive and seat the projecting outer arm of a metallic securing element 12 (shown only at the right hand end of Fig. 2 and partly broken away) the inner arm of which is apertured, as at 13, for anchoring the same in embedded relation within the body of the tile, when the latter is being molded, while the outer projecting end is also suitably apertured, as at 14, to provide for a detachable connection with a securing nail or the like in the tiling support, as fully set forth in my aforesaid patent, but which requires no further description here, forming no essential part of the mold pans proper. I have shown these recesses 11, however, in both end walls, as the securing elements 12 project from one of the ends of the tile in some cases and from the opposite ends thereof in other instances, so that in actually laying the tiles they may be reversely disposed relatively to adjacent ones.

One end of the pan is shaped to provide a laterally restricted space 15 between the side walls thereof, which in turn will mold a tongue portion at that end of the tile, this space 15 being exteriorly bounded by the irregularly contoured end wall consisting in this instance, of a shortened central portion 7a, terminating at the corners in the angularly disposed sections 16, 17, 18 and 19, which obviously will form corresponding rabbeted corners or recesses at the opposite corners of that end of the tile, adapted to fit complementary portions in the ends of reversely disposed tiles in the tiling surface when laid, but this manner of laying the tiles is not illustrated, being no part of the invention for the molding of the tiles themselves.

20 simply designate air or blow holes in the bottom of the pan proper and its several pattern grooves as desired, and these holes may be employed or dispensed with as found expedient. If employed, however, they will furnish satisfactory means for the escape of any imprisoned air between the interior bottom surface of the pan and its plastic filling, while no appreciable amount of the material itself will escape therethrough.

In carrying out the primary features of my present invention, means must be provided to allow for the escape of any of the surplus filling material or plastic substance 22, in a pan below, which will naturally be displaced upon superposing another filled pan thereover, owing to the pressure weight of the latter, and one satisfactory means for accomplishing this is the provision of the peculiar formation of the offsetting curved shoulders 5, terminating in the correspondingly offset side walls 6 of the pans, which will leave open longitudinal spaces 23, between the lower curved surfaces 5 of a superposed pan and the upper ends of the side walls 6 of the pan below, as clearly shown in Fig. 3. The leaving of these longitudinal spaces 23 along the opposite walls of the pans is the preferred arrangement, for reasons further appearing, although in some respects, as to the exact positions and the actual length of these open spaces, this specific disposition and arrangement might be slightly modified without departing from the essential principle involved.

To make this correlative adjustment of the pans certain, guarding against any telescoping of the same, I also find it desirable to provide end supporting members therefor, and in the drawings these members are illustrated so as to additionally function as guiding and centering means for the pans.

As shown in detail at Fig. 4, these end supports comprise a vertical base plate 24, having an outwardly projecting top web 25 and an alined projecting bottom web 26, which latter is provided with a pair of downwardly disposed side ears 27, forming a channeled space on the under side of the lower web 26.

As many of these elements as desired may be secured to each end wall of the pan, and this may be conveniently done by welding the vertical portion 24 to the exterior faces thereof, the top webs 25 preferably lying about flush with the top edge face of the pan wall, while the channeled spaces of the bottom webs 26 project slightly below the bottom of the pan, so that when the pans are stacked, the bottom faces of the lower webs 26 seat upon the top faces of the upper webs 25, with the ears 27 of the former engaging the side edges of the latter in straddled position.

Thus the superposed pans are not only supported above the lower ones but they are also guided and held centered in proper vertical positions relatively thereto, insuring of the accurate alined molding of the respective grooves in the bottom faces of all of the tiles in the pans below.

In the drawings, two of such elements are shown attached to each of the end walls, in spaced relation, one each toward the sides of the pan, although obviously a single one of greater width may satisfactorily suffice in a central position on each end wall, and in fact the web 26 might be a continuous strip, with the upper webs 25 and the channeling ears 27 projected therefrom in relatively spaced positions therealong to function in the same manner as described.

In the operation of molding, a settling mold pan is first filled with the quaky mixture, and then may be properly jiggered to cause an even distribution of the mass therein. One of the metallic securing elements 12 is then set in place, at either end of the pan as desired, the inner arm thereof being pressed down into the soft mixture, for embedding the same therein, where it will obviously become anchored when the tile is fully set.

A similarly filled pan may now be superposed upon the lower pan, and the weight thereof, or other external pressure applied, will cause the transverse and longitudinal pattern beads 8, 9 and 10 of the upper pan to press down into the quaky mixture, forming corresponding interlocking grooves in the bottom face of the tile being molded in the pan below, the congruent pattern grooves 2, 3 and 4 in the pan below also molding the interlocking beads desired on the top face of the tile being molded therein.

At the same time any surplus material displaced in this operation will be exuded through the longitudinal spaces 23, and by the use of a proper scraping implement, run along the top edge faces of the side walls 6, this exuded mass may be smoothed off evenly with the top.

These operations may be repeated indefinitely, until a desired number of the mold pans, filled with the plastic mixture, have been built up in stacked assembly, the webs 25 and 26 and the depending ears 27 functioning as heretofore stated to maintain the several pans in their proper correlative molding positions.

The stacks of mold pans may now be set aside to allow the mixture to become fairly hardened, when the stacks may be knocked down, by removing the filled pans one by one, and upon inverting the same the finished tiles readily slide out of their respective pans, owing to the slightly flaring disposition of the end and side walls. The tiles may then be set aside, independently of their mold pans, for thorough induration before actual commercial use.

The object of arranging the short and long transverse pattern grooves 2 and 3 in staggered relation is that zig-zag spaces or channels are provided between the interlocking beads, formed on the top faces of the tiles, permitting of the proper drainage between an upper and lower laid tile, for carrying off any water that may have seeped under the interlocked adjacent ends thereof.

Having thus fully disclosed my improved form of mold pans, and their operation and functioning in associated stacked relation, what I claim, as new and patentable, is:—

1. In molds for tiles, the combination of a plurality of uniform shallow settling mold pans, each having a closed bottom, formed with end transverse and side longitudinal pattern grooves and beads as set forth, and provided with flaring end walls, the upper terminal portions of the outer side walls of said longitudinal grooves being projected outwardly and thence continuing upwardly, as uninterrupted flaring side walls, substantially offset from said longitudinal grooves; and means for so supporting said pans, in superposed stacked relation, as to cause the side walls of adjacent assembled pans to coöperate in the formation of uncovered open spaces extending lengthwise therebetween, and functioning to permit of the free discharge of excess material in a pan below, substantially as described.

2. In molds for tiles, a plurality of shallow settling mold pans, of uniform dimensions, each having a closed bottom provided with flaring end and side walls, and said bottom being suitably depressed to form end transverse and side longitudinal pattern grooves along the inside face thereof and congruent pattern beads on its outside face; in combination with means for guiding, centering and supporting said pans in superposed stacked relation, said means consisting of substantially U-shaped members, fixedly secured at the same relative positions on walls of the pan, each including a downwardly channeled bottom projecting web and an alining top projecting web, the opposed webs of the respective pans coöperatively functioning, substantially as described.

In testimony whereof, I affix my signature.

JOHN A. FERGUSON.